United States Patent
Noro et al.

(10) Patent No.: US 7,312,754 B2
(45) Date of Patent: Dec. 25, 2007

(54) PLANAR ANTENNA CAPABLE OF DECREASING THE NUMBER OF PARTS

(75) Inventors: Junichi Noro, Akita (JP); Kanenari Kusanagi, Akita (JP); Yoshiaki Imano, Akita (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 60 days.

(21) Appl. No.: 11/291,645

(22) Filed: Nov. 30, 2005

(65) Prior Publication Data

US 2006/0187122 A1 Aug. 24, 2006

(30) Foreign Application Priority Data

Feb. 23, 2005 (JP) ............................. 2005-047086

(51) Int. Cl.
*H01Q 1/38* (2006.01)
*H01Q 5/00* (2006.01)
*H01Q 9/04* (2006.01)
*H01Q 1/24* (2006.01)
*H01Q 1/32* (2006.01)

(52) U.S. Cl. ............................. 343/700 MS; 343/702; 343/713

(58) Field of Classification Search ......... 343/700 MS, 343/702, 711, 712, 713, 872; 455/575, 90
See application file for complete search history.

(56) References Cited

U.S. PATENT DOCUMENTS

| 5,861,850 | A | * | 1/1999 | Robertson et al. | ........... 343/702 |
| 6,016,128 | A | * | 1/2000 | Imamura et al. | ............ 343/741 |
| 6,690,335 | B2 | * | 2/2004 | Onishi et al. | ............... 343/872 |
| 7,187,333 | B2 | * | 3/2007 | Yoneya et al. | .............. 343/713 |
| 2002/0109633 | A1 | * | 8/2002 | Ow et al. | ............ 343/700 MS |

FOREIGN PATENT DOCUMENTS

| JP | 2001-24428 | A | | 1/2001 |
| JP | 2001068912 | A | * | 3/2001 |

* cited by examiner

*Primary Examiner*—Hoang V Nguyen
*Assistant Examiner*—Robert Karacsony
(74) *Attorney, Agent, or Firm*—Frishauf, Holtz, Goodman & Chick, P.C.

(57) ABSTRACT

In a planar antenna including a board having an upper surface on which a planar antenna element pattern is formed, a probe for feeding to the planar antenna element pattern by electromagnetic coupling, a ground plate, and a base having a groove for disposing the probe therein, the planar antenna has a fastening member for fastening the board to the ground plate with the base sandwiched therebetween. The fastening member has a case, disposed on the upper surface of the board, having four bosses which extend downwards and which have four screw holes and four screws threaded to the four screw holes from the ground plate side.

5 Claims, 19 Drawing Sheets

PLANAR ANTENNA CAPABLE OF DECREASING THE NUMBER OF PARTS

This application claims priority to prior application JP 2005-47086, the disclosure of which is incorporated herein by reference.

BACKGROUND OF THE INVENTION

This invention relates to a planar antenna and, in particularly, to a planar antenna for use in reading information related to a product from a µ chip which comprises a super miniature wireless IC (integrated circuit) chip embedded in the product as a product tag (an IC tag).

In prior art, in order to identify a product (an article), a bar code is pasted to the product. In addition, by reading the bar code by a bar code reader, information related to the produce is read.

In recent years, the super miniature wireless IC chip called the µ chip has been developed and the µ chip has been preliminarily embedded in the product as the produce tag (the IC tag). By transmitting and receiving an electric wave between the µ chip and an antenna, it is possible to read information related to the produce in question. The electric wave used has a frequency of 2.4 gigahertz (GHz).

As the antennas for transmitting/receiving the electric wave to/from the µ chip, those of various types are used. As one of such antennas, a planar antenna may be used which is disclosed in Japanese Unexamined Patent Publication Tokkai No. 2001-24428 or JP-A 2001-24428. According to JP-A 2001-24428, the planar antenna comprises an upper case, a planar antenna element disposed at backside of the upper case with first regular intervals, a ground plate disposed at second regular intervals from the planer antenna element, and feeding leads disposed between the planer antenna element and the ground plate.

In JP-A 2001-24428, in order to dispose the planar antenna element with the first regular intervals from the upper case, a plurality of small protrusions having first stepped parts are arranged at the central side of the backside of the upper case, and the planar antenna element having small holes at locations corresponding to the small protrusions is fixed to the upper case by fitting the small protrusions into the small holes. In addition, in order to dispose the ground plate with the second regular intervals from the planar antenna element, a plurality of large protrusions having second stepped parts are arranged near the peripheral of the backside of the upper case, and the ground plate having large holes at locations corresponding to the large protrusions is fixed to the upper case by fitting the large protrusions into the large holes.

In a conventional planar antenna, the plurality of small protrusions and the plurality of large protrusions are required to assemble the upper case, the planar antenna element, and the ground plate with intervals thereamong maintained at predetermined intervals. As a result, the conventional planar antenna is disadvantageous in that a lot of parts are required to assemble the conventional planar antenna.

SUMMARY OF THE INVENTION

It is therefore an object of the present invention to provide a planar antenna which is capable of decrease the number of parts.

Other objects of this invention will become clear as the description proceeds.

On describing the gist of an aspect of this invention, it is possible to be understood that a planar antenna comprises a board having an upper surface on which a planar antenna element pattern is formed, a probe for feeding to the planer antenna element pattern by electromagnetic coupling, a ground plate, and a base having a groove for disposing the probe therein. The base is disposed between the ground plate and the board. According to the aspect of this invention, the above-mentioned planar antenna further comprises a fastening member for fastening the board to the ground plate with the base sandwiched therebetween.

In the planar antenna according to the aspect of this invention, the fastening member may comprises a case, disposed on the upper surface of the board, having N bosses which extend downwards and which have N screw holes, where N represents an integer which is not less than three and N screws threaded in the N screw holes from the ground plate side. Preferably, each of the N screw holes may have a length longer than that of a thread portion of each of the N screws. Desirably, the ground plate may comprise N screw head rest portions, projected from the upper surface of the ground plate upwards, for resting head portions of the N screws. Preferably, a height each of the N screw head rest portions based on a lower surface of the ground plate may be higher than a thickness of each of head portions of the N screws. The N screw head rest portions may be formed by cutting and raising said ground plate.

DESCRIPTION OF THE PREFERRED EMBODIMENT

Figure 1:
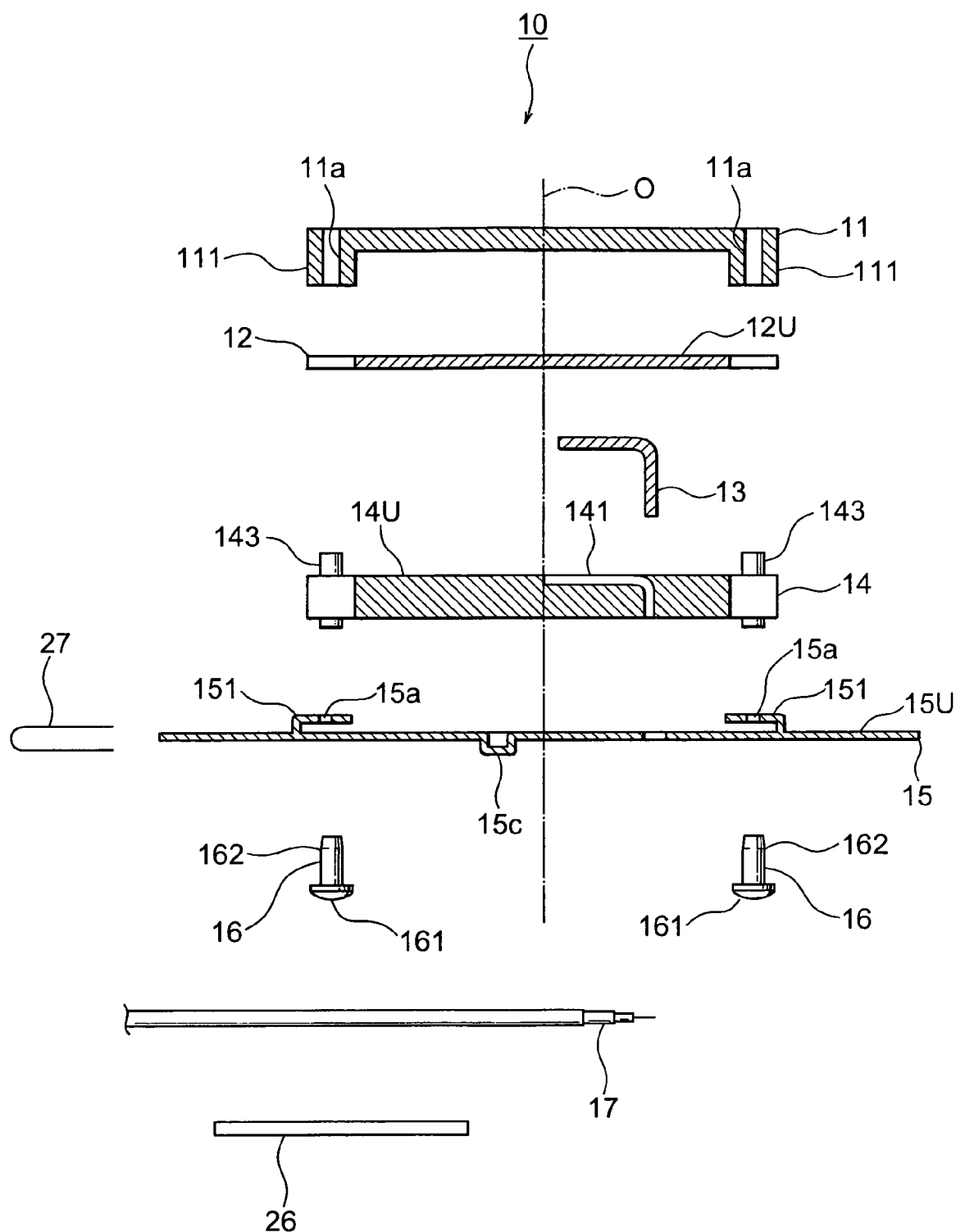
FIG. 1 is a schematic exploded cross sectional view of a planar antenna according to an embodiment of this invention.
Figure 2:
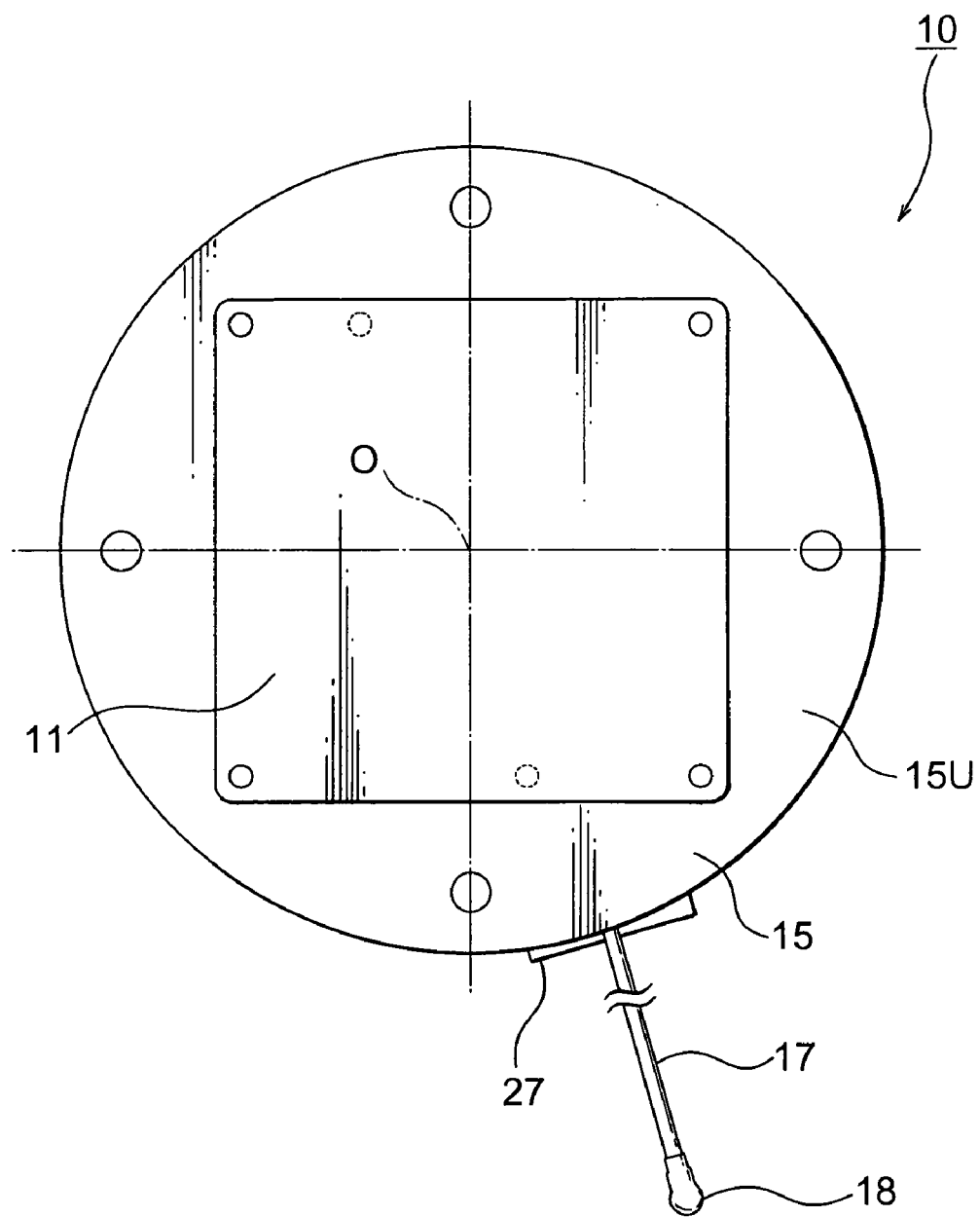
FIG. 2 is a plan view of the planar antenna illustrated in FIG. 1.
Figure 3:
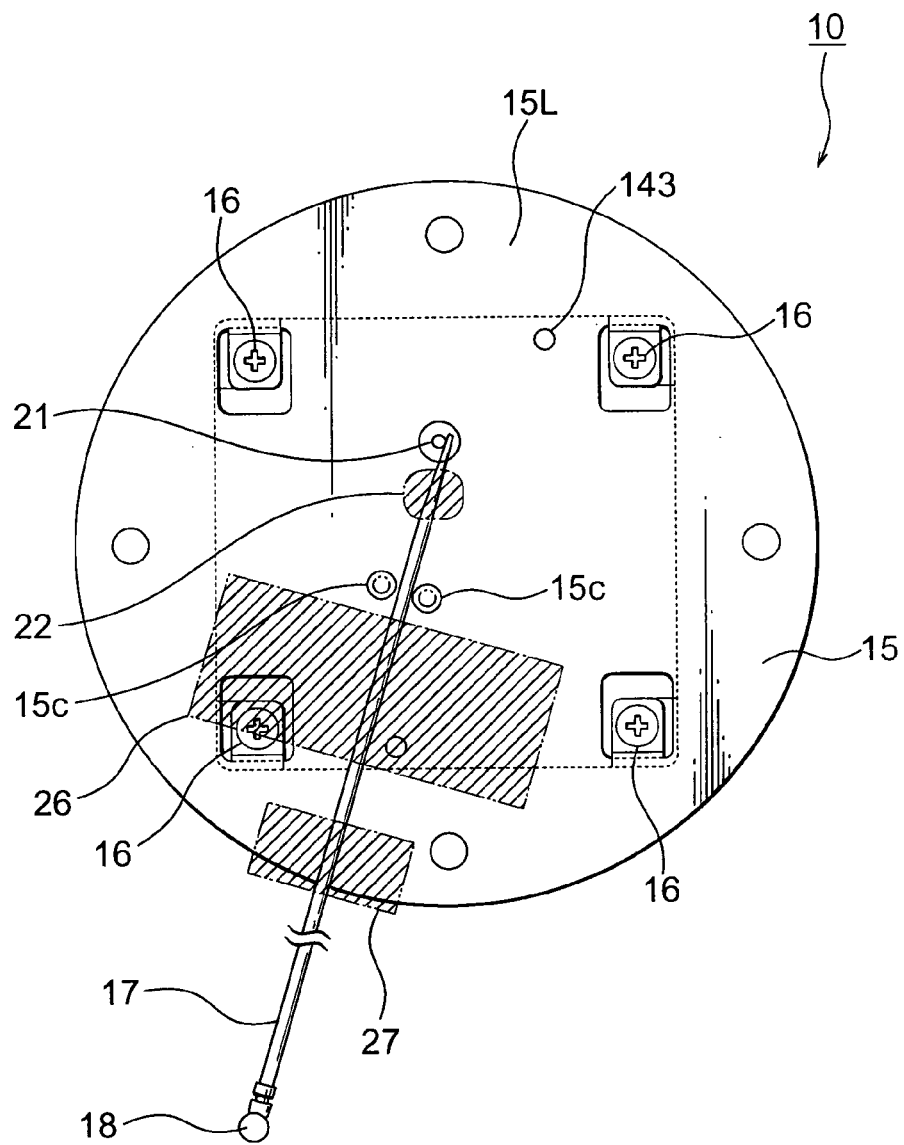
FIG. 3 is a bottom view of the planar antenna illustrated in FIG. 1.
Figure 4:
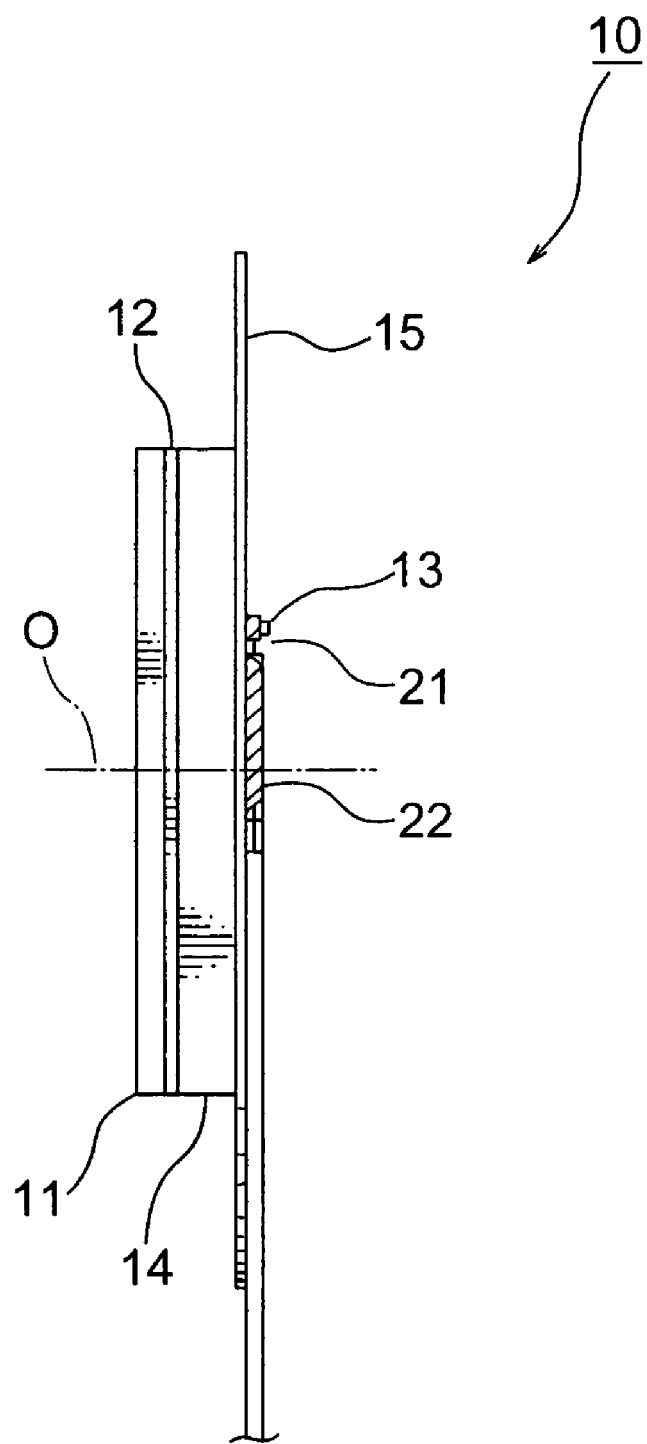
FIG. 4 is a side view of the planar antenna illustrated in FIG. 1.

Referring to FIGS. 1, 2, 3, and 4, description will proceed to a planar antenna 10 according to an embodiment of this invention. FIG. 1 is a schematic exploded cross sectional view of the planar antenna 10. FIG. 2 is a plan view of the planar antenna 10. FIG. 3 is a bottom view of the planar antenna 10. FIG. 4 is a side view of the planar antenna 10. The illustrated planar antenna 10 is an antenna for use in transmitting/receiving an electric wave to/from the above-mentioned IC tag.

The illustrated planar antenna 10 comprises a case 11, a board 12, a probe (feeding lead) 13, a base 14, and a ground plate 15. The case 11 is made of resin material, for example, such as heat-resistant ABS (acrylonitrile-butadiene-styrene) resin. The case 11 substantially has a shape of a square plate. The probe 13 is made of a copper lead and has about L-shaped. The base 14 is made of resin material, for example, such as heat-resistant ABS (acrylonitrile-butadiene-styrene) resin. The base 14 substantially has a shape of a square plate. The ground plate 15 substantially has a shape of a circular plate.

The ground plate 15 has an upper surface 15U on which the base 14 is disposed with a central axis O coincided with each other. The base 14 has a L-shaped groove 141 for disposing the probe 13 therein. The base 14 has an upper surface 14U on which the board 12 is disposed. That is, the base 14 is disposed between the ground plate 15 and the board 12. The board 12 has a planar antenna element pattern formed thereon that will later be described. The board 12 has an upper surface 12U on which the case 11 is disposed. The ground plate 15, the base 14, the board 12, and the case 11 are integrally fixed by four tapping screws 16. The probe 13 is for feeding to the planar antenna element pattern by electromagnetic coupling.

Figure 5:
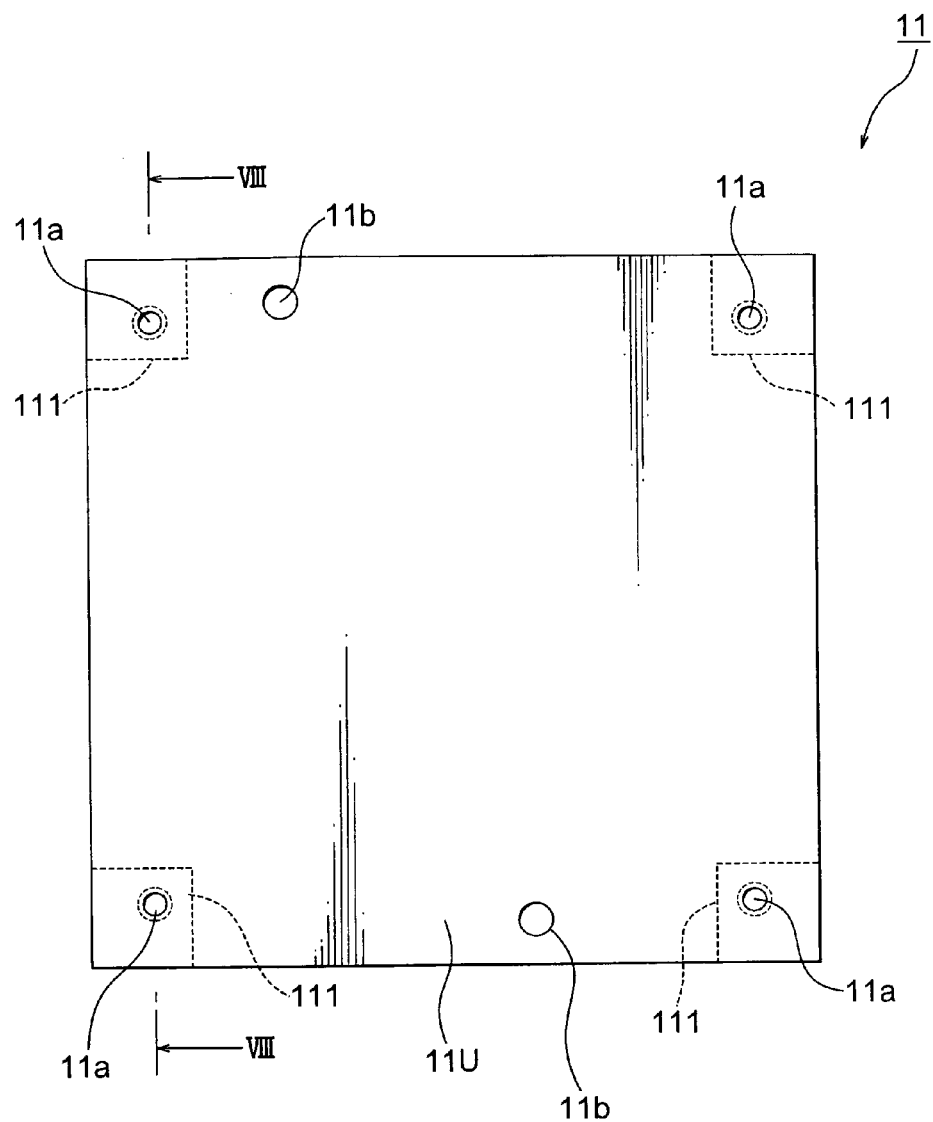
FIG. 5 is a plan view of a case for use in the planar antenna illustrated in FIG. 1.
Figure 6:
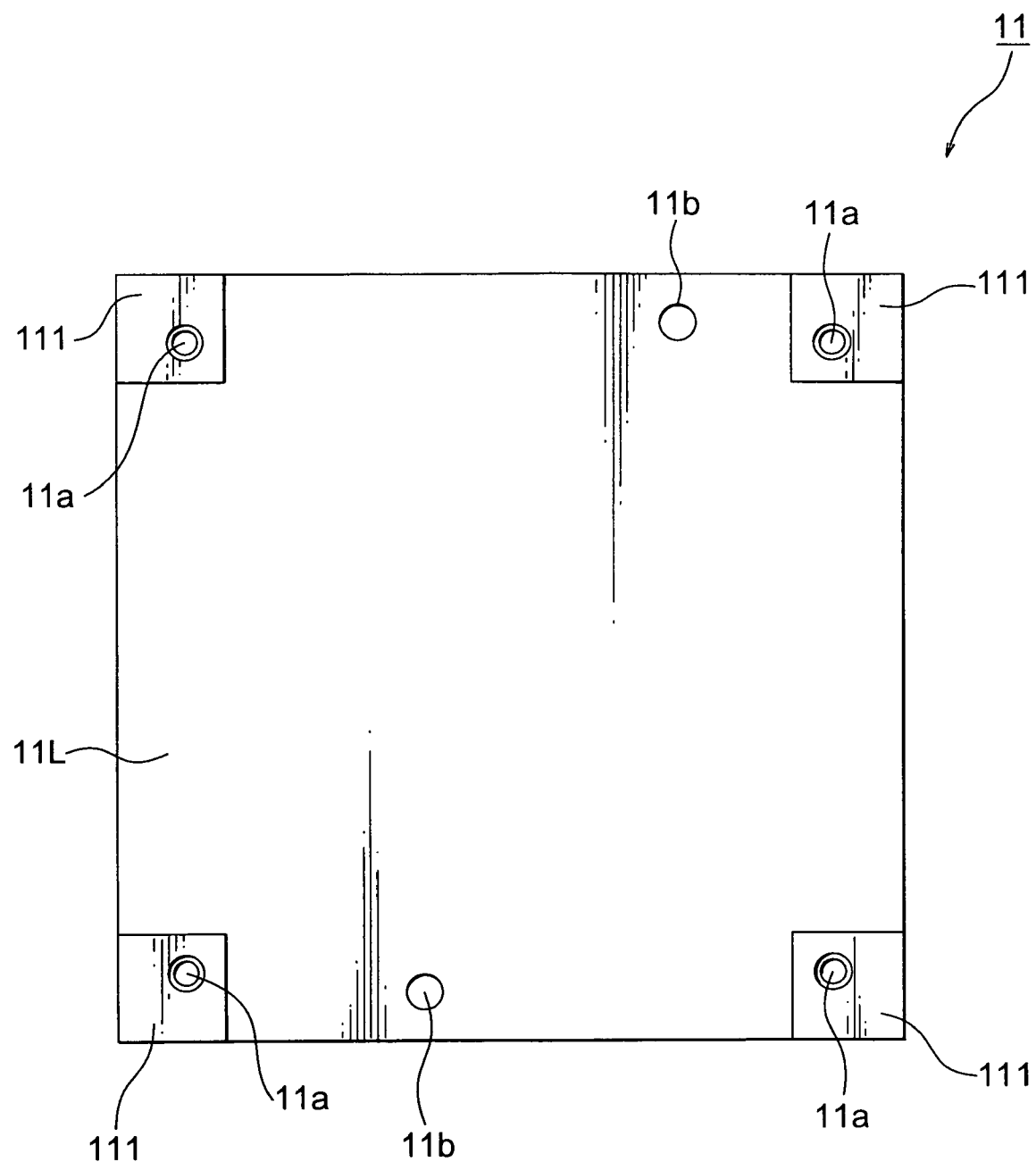
FIG. 6 is a bottom view of the case illustrated in FIG. 5.
Figure 7:
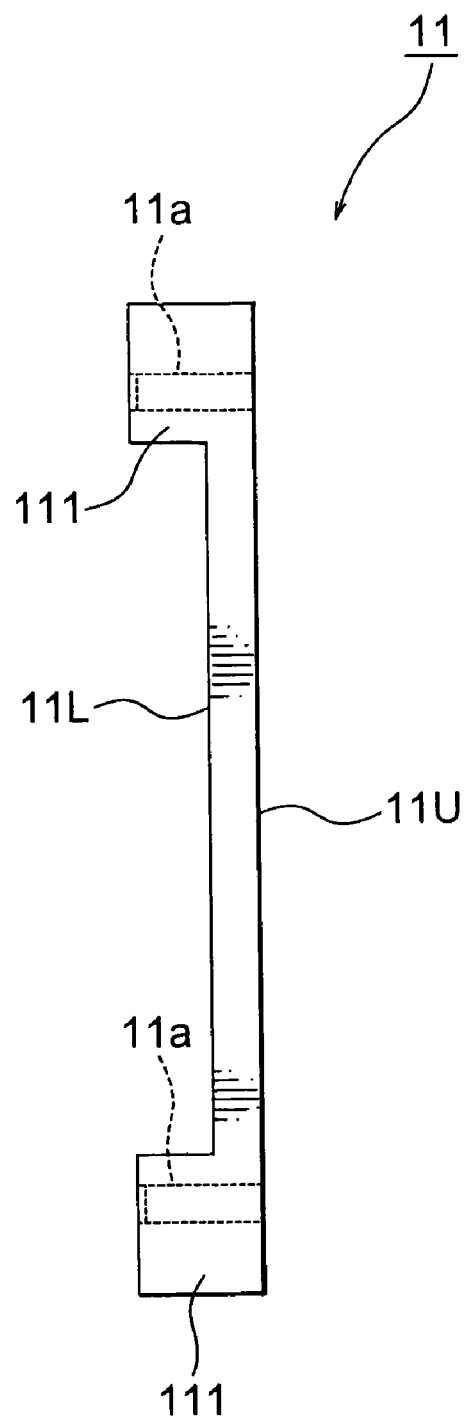
FIG. 7 is a side view of the case illustrated in FIG. 5.
Figure 8:
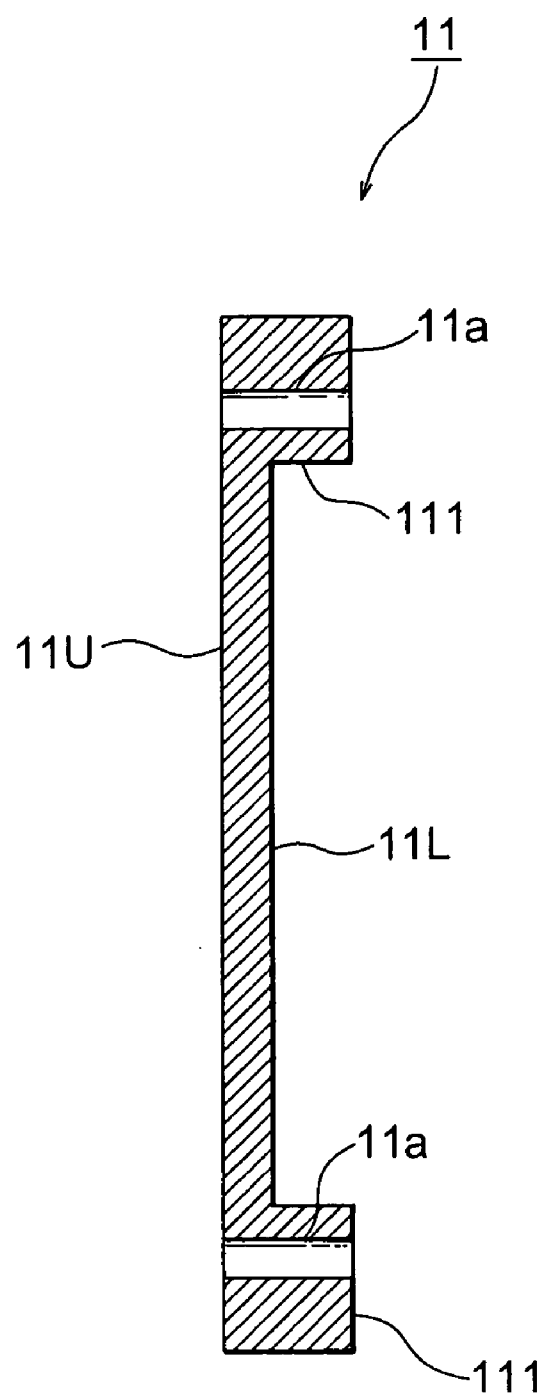
FIG. 8 is a cross-sectional view taken on line VIII-VIII of FIG. 5.

Referring to FIGS. 5, 6, 7, and 8, the description will proceed to the case 11 for use in the planar antenna 10 illustrated in FIG. 1. FIG. 5 is a plan view of the case 11. FIG. 6 is a bottom view of the case 11. FIG. 7 is a side view of the case 11. FIG. 8 is a cross-sectional view taken on line VIII-VIII of FIG. 5.

The case 11 has the upper surface 11U and a lower surface 11L. The case 11 comprises four bosses 111 having a rectangular parallelepiped shape which project from the lower surface 11L at four corners thereof downwards. Each of the four bosses 111 has a screw hole 11a with female thread for screwing the above-mentioned tapping screw 16 therein. In other words, the four tapping screw 16 are threaded in the four screw holes 11a from the ground plate 15 side. Accordingly, each boss 111 serves as a nut into which the tapping screw 16 is screwed. As a result, inasmuch as a nut as a different part is not necessary, it is possible to decrease the number of parts. In addition, the screw hole 11a has a length longer than that of a thread portion 162 of the tapping screw 16. Therefore, the screw portion 162 of the tapping screw 16 is not projected from the upper surface 11U of the case 11. Furthermore, the case 11 has two through holes 11b for inserting positioning pins of the base 14 which will later be described.

At any rate, a combination of the case 11 having the four bosses 111 and the four tapping screws 16 serves as a fastening member for fastening the board 12 to the ground plate 15 with the base 14 sandwiched therebetween.

Figure 9:
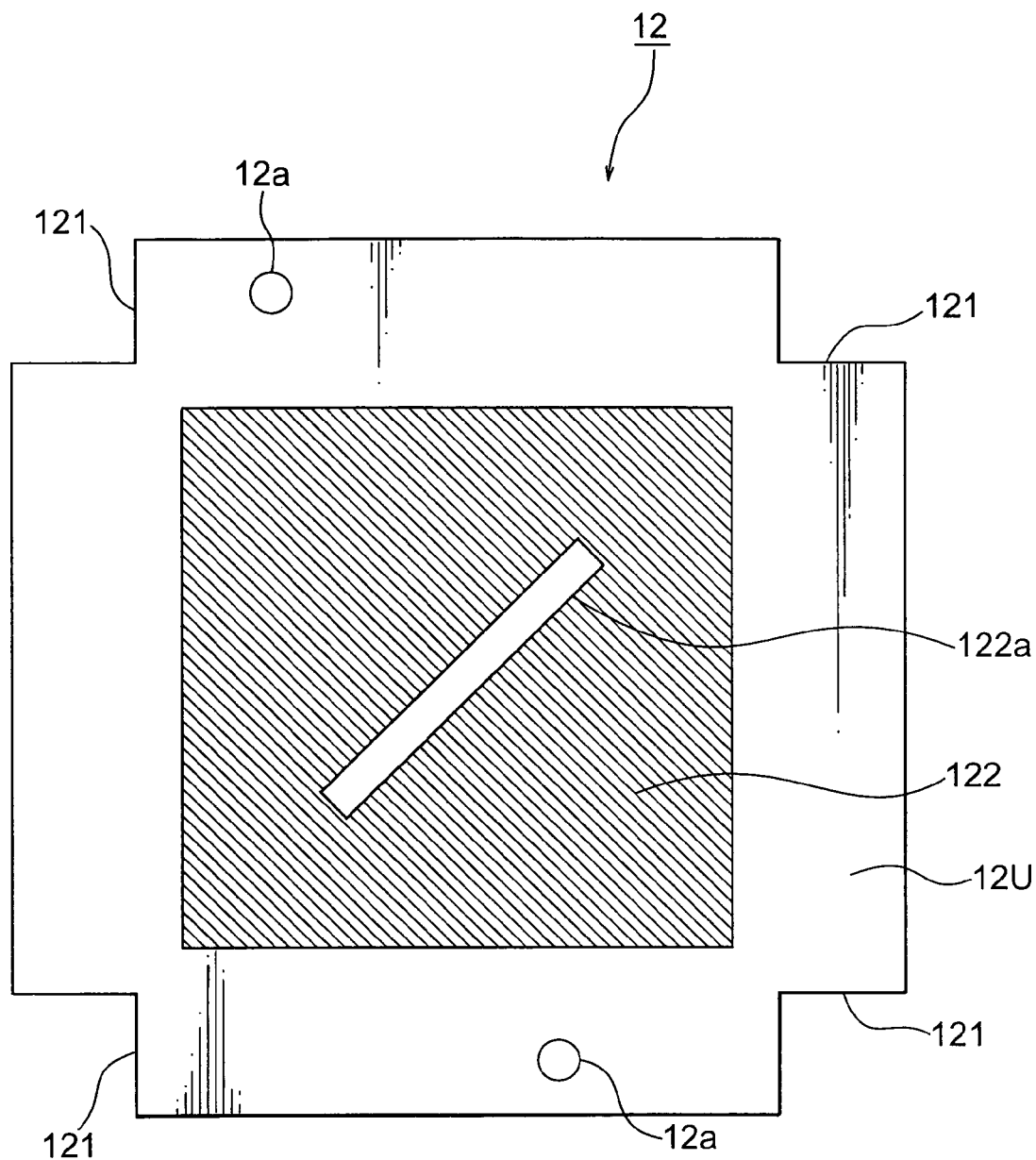
FIG. 9 is a plan view of a board for use in the planar antenna illustrated in FIG. 1.

FIG. 9 is a plan view of the board 12 for use in the planar antenna 10 illustrated in FIG. 1. The board 12 has four corners which are notched in a square shape for passing through the four bosses 111 of the case 11. In other words, the board 12 has four notches 121 at the four corners thereof. In addition, the board 12 has two through holes 12a for inserting the positioning pins at locations corresponding to the two through holes 11b of the case 11. On the upper surface 12U of the board 12, the above-mentioned planar antenna element pattern 122 is formed at the center thereof. The planar antenna element pattern 122 is made of, for example, copper foil. The planar antenna element pattern 122 has a long groove 122a extending in a diagonal direction spread between a right-upper portion and a left-lower portion in FIG. 9.

Figure 10:
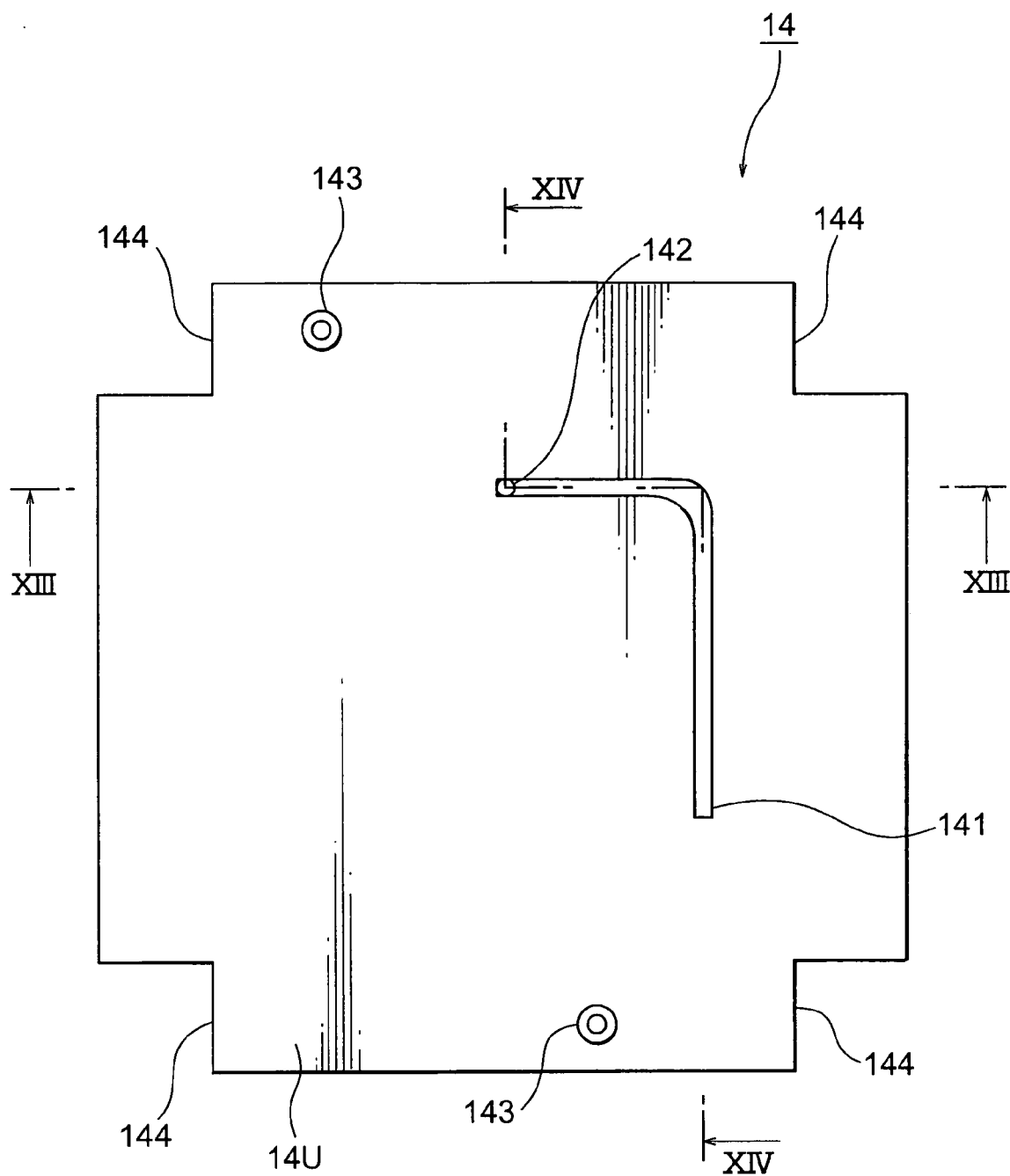
FIG. 10 is a plan view of a base for use in the planar antenna illustrated in FIG. 1.
Figure 11:
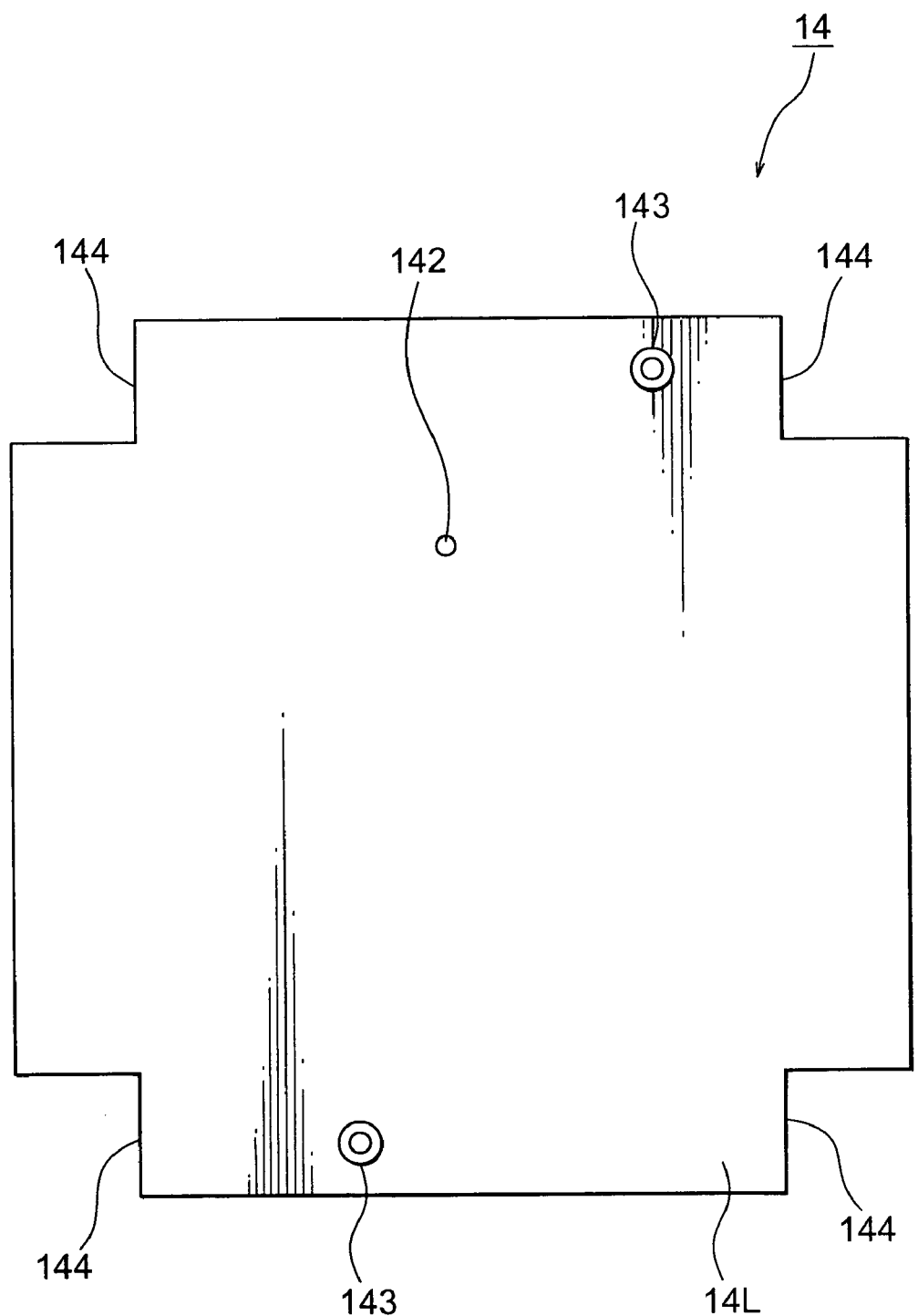
FIG. 11 is a bottom view of the base illustrated in FIG. 11.
Figure 12:
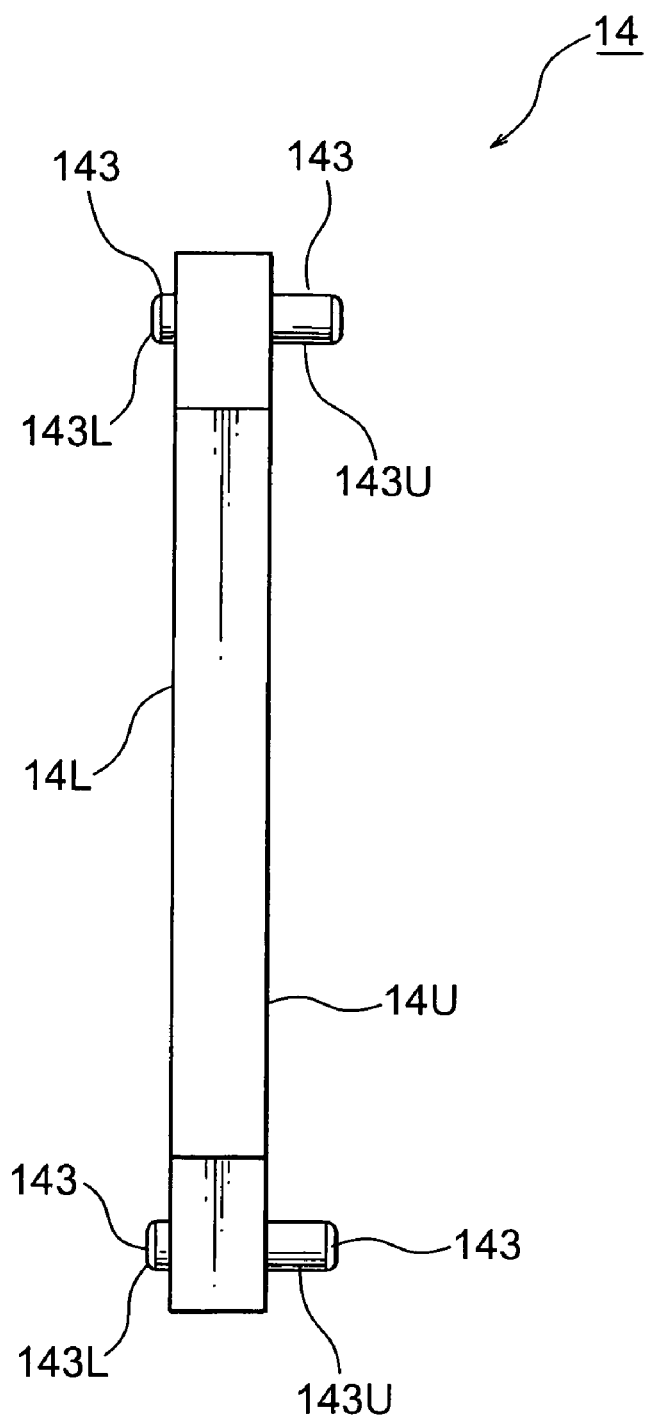
FIG. 12 is a side view of the base illustrated in FIG. 11.
Figure 13:
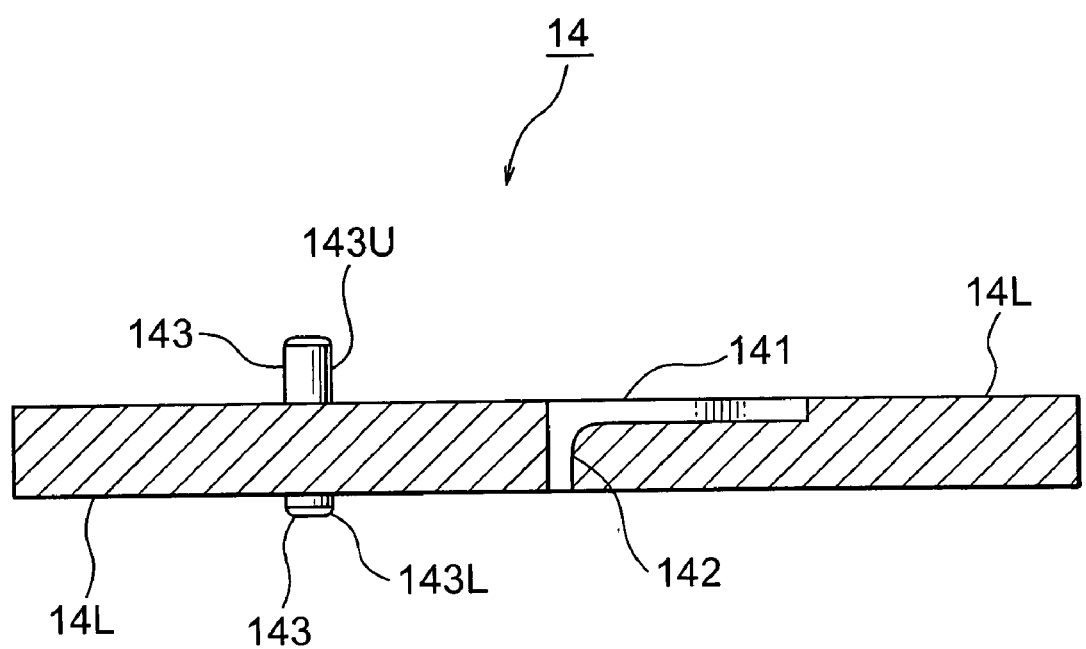
FIG. 13 is a cross-sectional view taken on line XIII-XIII of FIG. 10.
Figure 14:
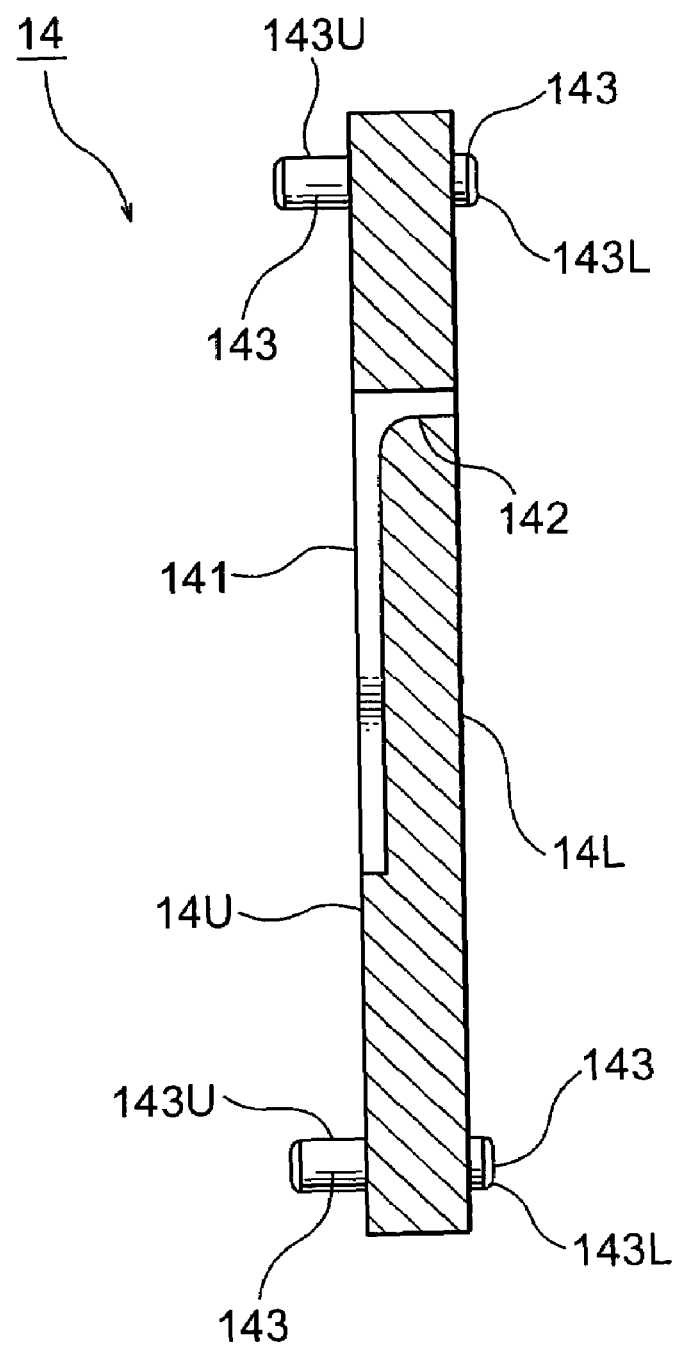
FIG. 14 is a cross-sectional view taken on line XIV-XIV of FIG. 10.

Referring to FIGS. 10 through 14, the description will proceed to the base 14 for use in the planar antenna 10 illustrated in FIG. 1. FIG. 10 is a plan view of the base 14. FIG. 11 is a bottom view of the base 14. FIG. 12 is a side view of the base 14. FIG. 13 is a cross-sectional view taken on line XIII-XIII of FIG. 10. FIG. 14 is a cross-sectional view taken on line XIV-XIV of FIG. 10.

The base 14 has the upper surface 14U and a lower surface 14L. The base 14 has a L-shaped groove 141 on the upper surface 14U. The base 14 has a through hole 142 extending at an end of the L-shaped groove 141 downwards. The above-mentioned probe 13 is disposed along the L-shaped groove 141 and the through hole 142. The base 14 has the above-mentioned two positioning pins 143. The positioning pins 143 extend from base 14 up and down. Each positioning pin 143 has an upper protrusion 143U protruding from the upper surface 14U and a lower protrusion 143L protruding from the lower surface 14L. The upper protrusion 143U is longer than the lower protrusion 143L. This is because the upper protrusion 143U of the positioning pin 143 is required to pass through the through hole 12a of the above-mentioned board 12 and the through hole 11b of the above-mentioned case 11. Like the board 12, the base 14 has four corners which are notched in a square shape for passing through the four bosses 111 of the case 11. In other words, the base 14 has four notches 144 at the four corners thereof.

Figure 15:
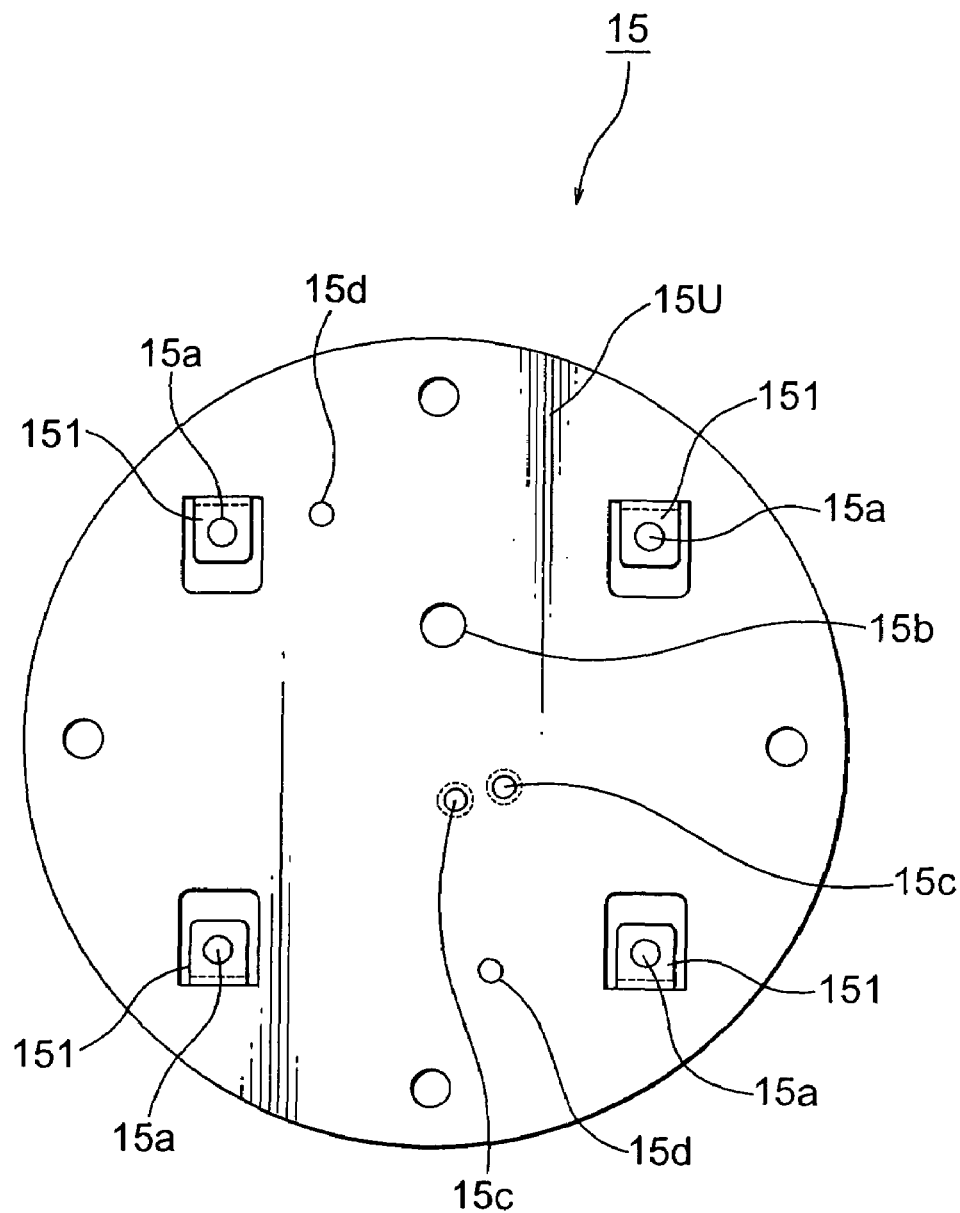
FIG. 15 is a plan view of a ground plate for use in the planar antenna illustrated in FIG. 1.
Figure 16:
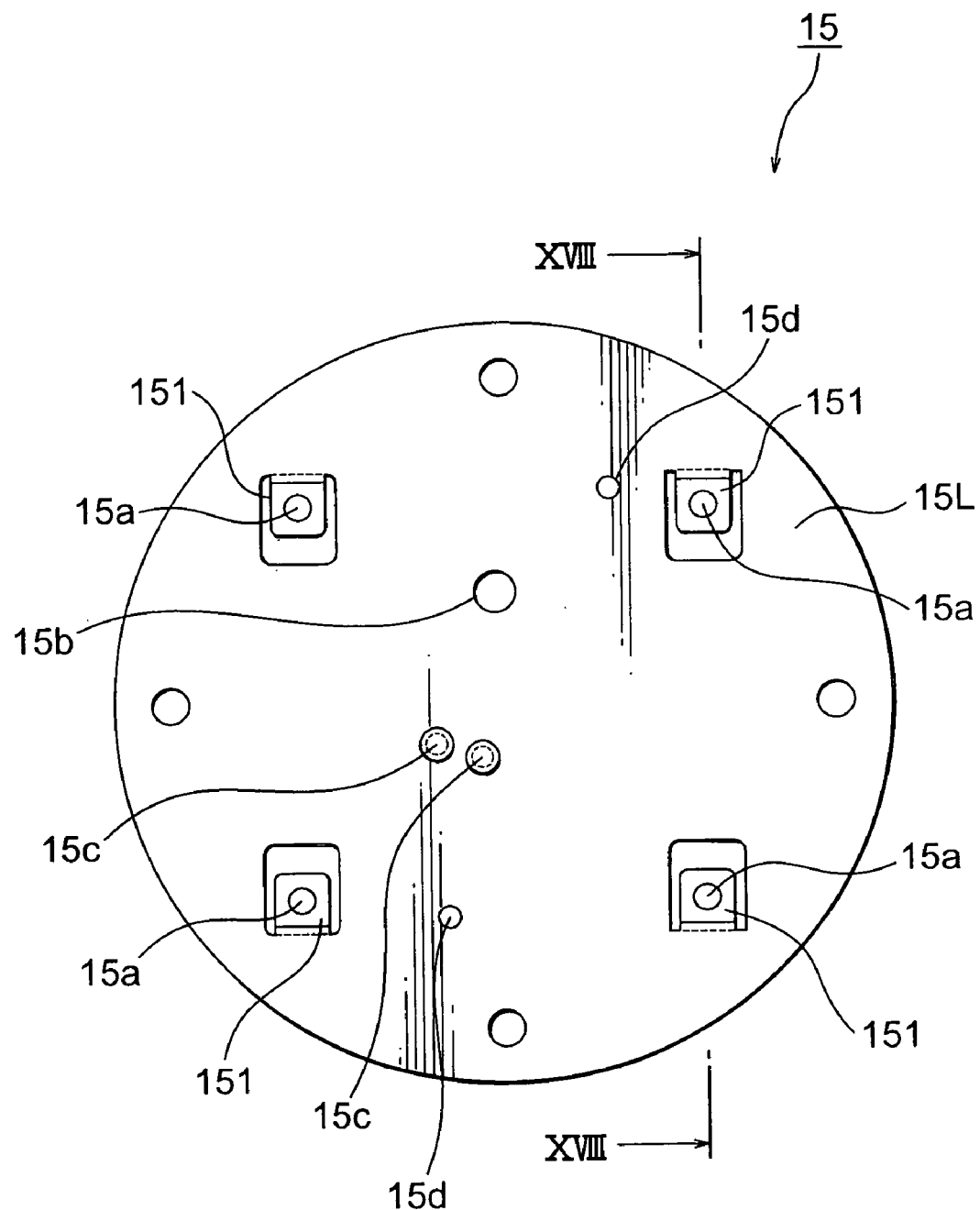
FIG. 16 is a bottom view of the ground plate illustrated in FIG. 15.
Figure 17:
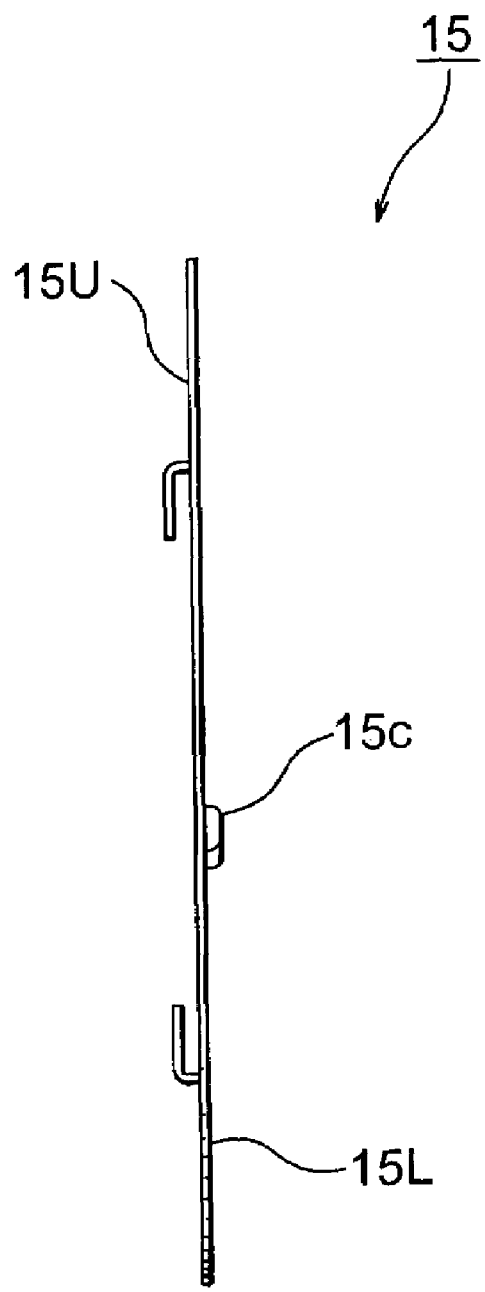
FIG. 17 is a side view of the ground plate illustrated in FIG. 15.
Figure 18:
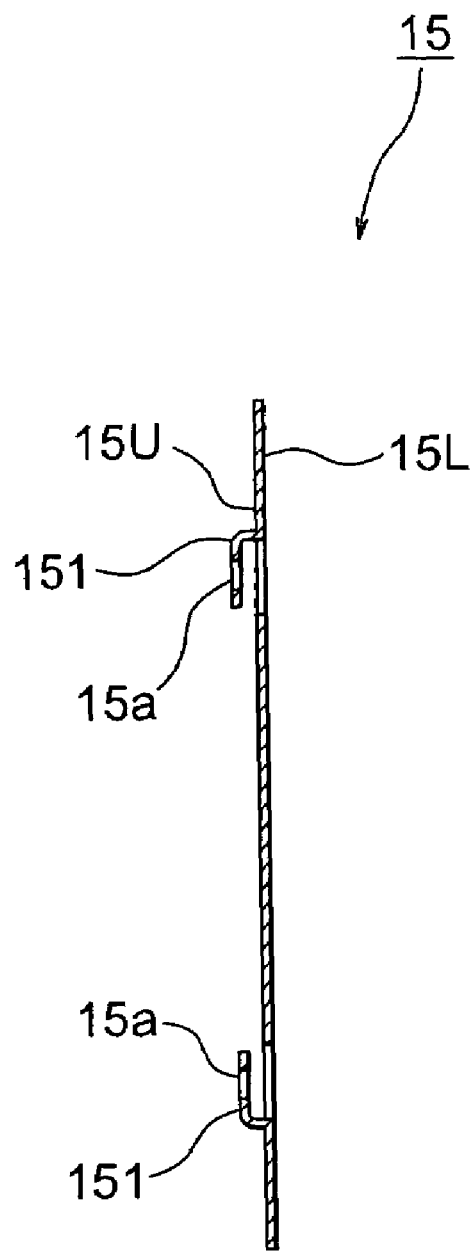
FIG. 18 is a cross-sectional view taken on line XVIII-XVIII of FIG. 16.

Referring to FIGS. 15 through 18, the description will proceed to the ground plate 15 for use in the planar antenna 10 illustrated in FIG. 1. FIG. 15 is a plan view of the ground plate 15. FIG. 16 is a bottom view of the ground plate 15. FIG. 17 is a side view of the ground plate 15. FIG. 18 is a cross-sectional view taken on line XVIII-XVIII of FIG. 16.

The ground plate 15 has the upper surface 15U and a lower surface 15L. The ground plate 15 has four screw head rest portions 151 projecting from the upper surface 15U upwards at locations corresponding to the four bosses 111 of the case 11. The screw head rest portions 151 are formed by cutting and raising the ground plate 15 and have a L-shape in cross section. A height of each screw head rest portion 151 based on the lower surface 15L of the ground plate 15 is higher than a thickness of the a head portion 161 of the tapping screw 16. Each screw head rest portion 151 has a through hole 15a for passing through the screw portion 162 of the tapping screw 16. The four screw head rest portions 151 are for resting head portions 161 of the four tapping screws 16. In other words, each screw head rest portion 151 acts as a washer for the tapping screw 16. As a result, washers as different parts are not necessary and it is possible to decrease the number of parts.

The ground plate 15 has a hole 15b for passing through the probe 13. The ground plate 15 has a pair of protrusions 15c for protruding from the lower surface 15L downwards. The pair of protrusions 15c are for positioning the cable, which will later be described, by sandwiching the cable therebetween. The protrusions 15c are formed by coining the ground plate 15. The ground plate 15 further has two through holes 15*d* for inserting the two lower protrusion 143L of the two positioning pins 143 of the base 14 therein.

Figure 19:
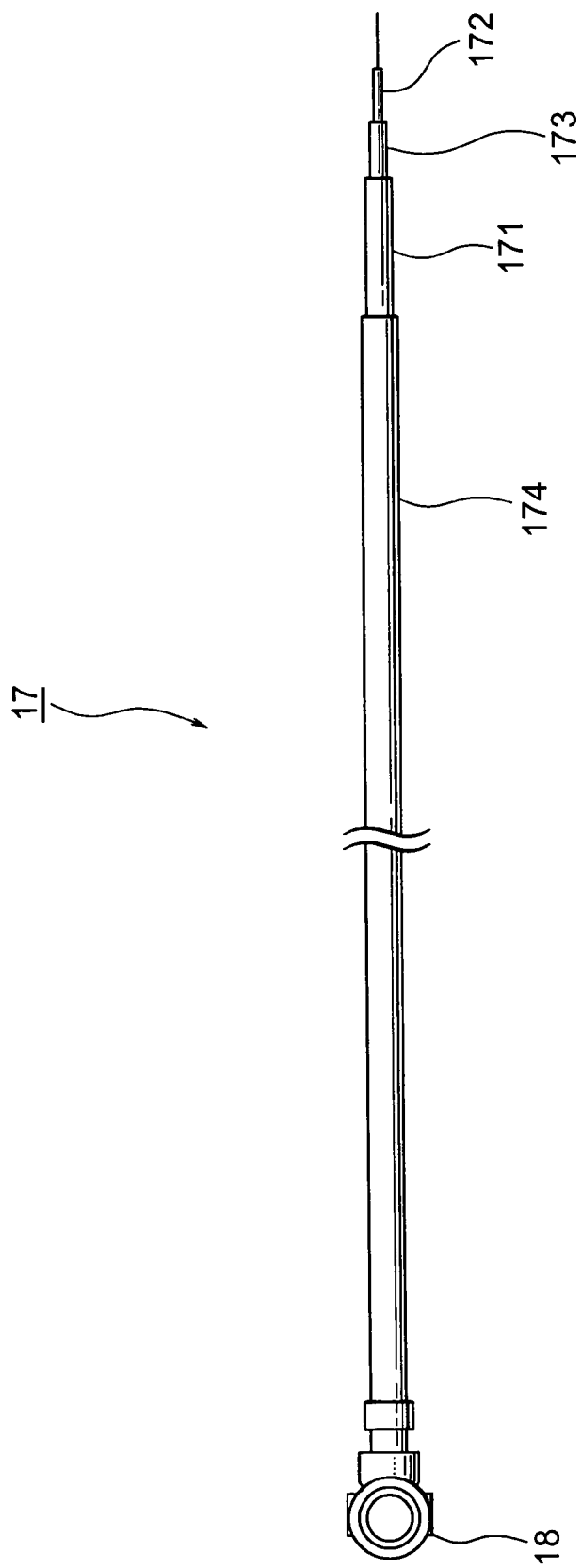
FIG. 19 is a plan view of a cable for use in the planar antenna illustrated in FIG. 1.

Referring to FIG. 19, the description will proceed to the cable 17 for use in the planar antenna 10 illustrated in FIG. 1. The illustrated cable 17 is a coaxial cable. As well known in the art, the coaxial cable 17 is an electric-signal transmission medium having a coaxial form, which includes a cylindrical outer-conductor 171 and a central conductor 172. A cylindrical insulator 173 insulates between the outer conductor 171 and the central conductor 172. The outer conductor 171 is covered with a sheath 174.

As shown in FIG. 19, the sheath 174, the outer conductor 171, and the insulator 173 of the cable 17 are cut out in a tip portion thereof to expose the central conductor 172, the insulator 173, and the outer conductor 171 of the cable 17. On the other hand, the cable 17 has an back end portion to which a connector 18 is attached.

As shown in FIGS. 3 and 4, the cable 17 is disposed on the lower surface 15U of the ground plate 15. Exposed at the tip portion of the cable 17, the central conductor 172 is electrically connected to the probe 13 by solder 21. In addition, exposed at the tip portion of the cable 17, the outer conductor 171 is electrically connected to the ground plate 15 by solder 22. The cable 17 is positioned by sandwiching the cable 17 between the pair of protrusions 15*c* of the ground plate 15.

The cable 17 is fixed on the lower surface 15U of the ground plate 15 by an adhesive tape 26. In addition, another adhesive tape 27 is pasted at an edge contact portion between the cable 17 and the ground plate 15.

Inasmuch as the base 14 is disposed between the ground plate 15 and the board 12 having the upper surface 12U on which the planar antenna element pattern 122 is formed and they are fastened by the fastening member, it is possible to maintain an interval between the planar antenna element pattern 122 and the ground plate 15 at a predetermined interval by using a few parts.

By using, as the fastening member, a combination of the case 11 including the four bosses 111 extending downwards and having the four screw hole 11*a* and the four screws 16 threaded in the four screw holes 11*a*, four nuts are omitted and it results in decreasing the number of parts. By providing the ground plate 15 with the four screw head rest portions 151 projecting upwards, four washers are omitted and it results in decreasing the number of parts. Inasmuch as the height of each screw head rest portion based on the lower surface 15L of the ground plate 15 is higher than the thickness of the head portion 161 of the screw 16, the planar antenna 10 has structure where the screws 16 are not projected from the planar antenna 10. Therefore, inasmuch as it is possible to get rid of any obstruction on mounting and assembling the planar antennal 10 to a set on the customer's premises, it is possible to improve assembling.

While this invention has thus far been described in conjunction with a preferred embodiment thereof, it will now readily possible for those skilled in the art to put this invention into various manners. For example, although the four bosses 111 and the four screws 16 are provided in the planar antenna 10 according to the above-mentioned embodiment, the number of them may be N or more, where N represents an integer which is not less than three. Although the combination of the case 11 including the bosses 111 and the screws 16 is used as the fastening member in the planar antenna 10 according to the above-mentioned embodiment, the fastening member may not be restricted to this.

What is claimed is:

1. A planar antenna comprising:
   a board having an upper surface on which a planar antenna element pattern is formed;
   a probe for feeding to said planer antenna element pattern by electromagnetic coupling;
   a ground plate;
   a base having a groove in which said probe is disposed, said base being disposed between said ground plate and said board; and
   a fastening member which fastens said board to said ground plate with said base sandwiched therebetween;
   wherein said ground plate has an upper surface on which said base is disposed, and said base has an upper surface on which said board is disposed, so that said base is directly sandwiched between the ground plate and the board;
   wherein said fastening member comprises: (i) a case disposed on the upper surface of said board, said case having N bosses which extend downwards and which have N screw holes, where N represents an integer which is not less than three; and (ii) N screws threaded in said N screw holes from a side of the ground plate; and
   wherein said board has N notches passing through said N bosses, and said base has N notches passing through said N bosses.

2. The planar antenna as claimed in claim 1, wherein each of said N screw holes has a length longer than a length of a thread portion of each of said N screws.

3. The planar antenna as claimed in claim 1, wherein said ground plate comprises N screw head rest portions, projected upwards from the upper surface of said ground plate, on which head portions of said N screws are rested.

4. The planar antenna as claimed in claim 3, wherein a height of each of said N screw head rest portions based on a lower surface of said ground plate is higher than a thickness of each of the head portions of said N screws.

5. The planar antenna as claimed in claim 3, wherein said N screw head rest portions have an L-shape in cross section.

* * * * *